REPROCESSING PHONOGRAPH RECORD DISKS

Filed May 15, 1948 2 Sheets-Sheet 1

INVENTOR
DONALD F. BALMER
BY H. G. Manning
ATTORNEY

REPROCESSING PHONOGRAPH RECORD DISKS

Filed May 15, 1948 2 Sheets-Sheet 2

INVENTOR

DONALD F. BALMER

BY H. G. Manning

ATTORNEY

Patented Jan. 30, 1951 2,539,717

UNITED STATES PATENT OFFICE 2,539,717

REPROCESSING PHONOGRAPH RECORD DISKS

Donald F. Balmer, New Haven, Conn., assignor to The Soundscriber Corporation, New Haven, Conn., a corporation of Connecticut Application May 15, 1948, Serial No. 27,254

14 Claims. (Cl. 18—5.3)

This invention relates to the reprocessing of used thermoplastic phonograph record disks, and more particularly to the restoration of such disks into condition for rerecording.

The apparatus and process herein disclosed is especially adapted for the restoration of record disks of thin plastic material in which a record groove has been previously embossed and indented, and in which the recording operation has produced deformations and strains in the material without breaking or cutting it.

The plastic material in disks of this type may, for example, be a vinyl resin material, such as a copolymer of vinyl chloride and vinyl acetate, and under normal temperature conditions will permanently retain a record groove which has been indented therein. It has been found that when such disks are heated above a certain critical temperature which is well below the melting point, all strains and stresses in the material will be relieved, so that the embossed grooves will disappear and both opposite surfaces of the disk will resume substantially the original smooth and polished characteristics which they had before the grooves were produced therein.

Accordingly, one object of this invention is to provide an apparatus for reprocessing a used phonograph record disk which includes means for heating such a disk and maintaining it in vertical flat condition until it has cooled and hardened.

Another object is to provide an apparatus of the above nature which includes means for obliterating record grooves from a phonograph record member, without removing any of the material thereof.

Another object is to provide an apparatus of the above nature which includes means for obliterating record grooves from both faces of the disks simultaneously.

A still further object is to provide an improved process for restoring such used record members to their original ungrooved condition.

A further object is to provide an apparatus of the above nature which will be simple in construction, inexpensive to manufacture, easy to install and manipulate, compact, and very efficient and durable in use.

With these and other objects in view, there has been illustrated on the accompanying drawing one form in which the invention may conveniently be embodied in practice.

Figure 1:
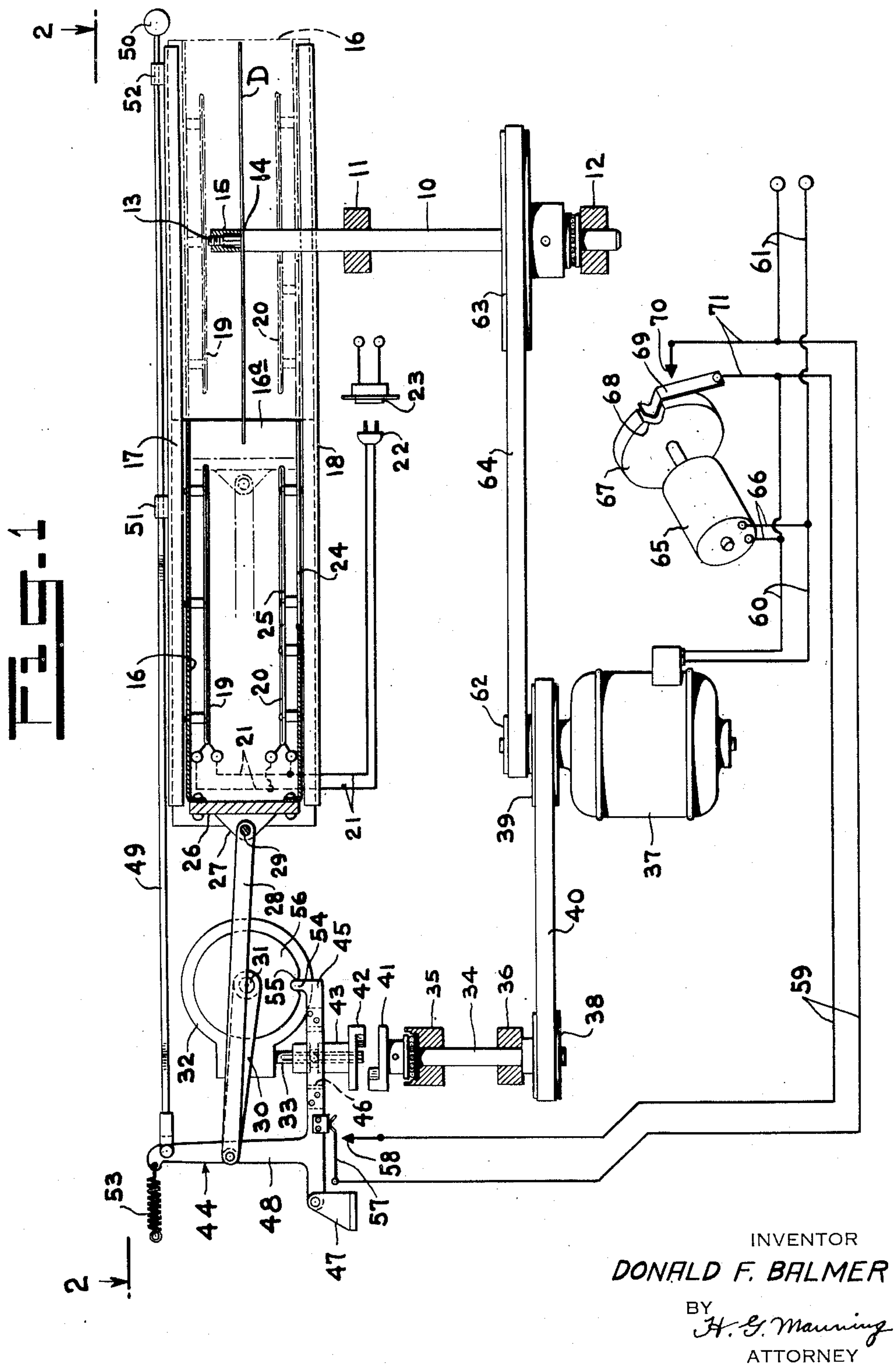
Fig. 1 is a plan view, partly diagrammatic of the improved record disk reprocessing machine as it would be seen from the line 1—1 of Fig. 2.
Figure 2:
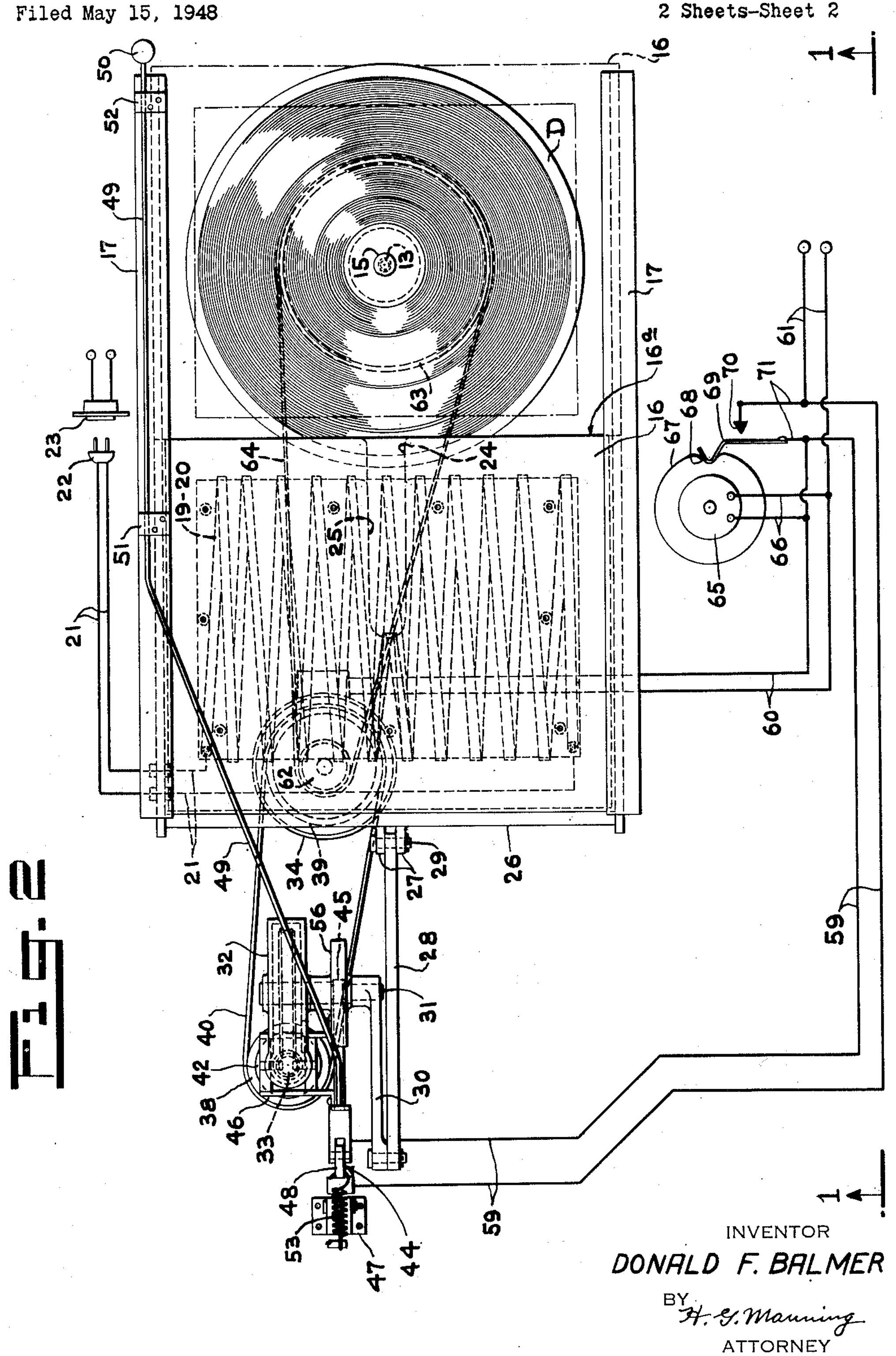
Fig. 2 is a side elevation of the same as it would be seen from the line 2—2 of Fig. 1.

Referring now to the drawings in which like reference characters denote corresponding parts throughout the several views, the numeral 10 indicates a horizontal shaft which is rotatably carried in bearings 11, 12, and is provided with a reduced threaded end 13. The threaded end 13 provides a shoulder 14, against which an apertured, previously recorded, vertical phonograph disk D which is to be reprocessed is adapted to be clamped by means of a nut 15.

In order to heat the disk D while it is continuously rotated with the shaft 10, provision is made of a slidable box-like heating chamber 16, which has an open front end 16*a* and is carried in pairs of horizontal corner guides 17, 18. The heating chamber 16 is adapted to slide in the guides 17, 18, from the full line position shown in the drawings, in which the operator will have full access to the disk D, to the dotted line position in which the heating chamber 16 will loosely embrace the disk D.

The interior of the heating chamber 16 is provided with a pair of flat electrical resistance heating elements 19, 20 which are mounted upon the opposite side walls of said chamber and are supplied with electric current by means of a pair of electric wires 21 connected to a two-prong plug 22 which is adapted to be inserted into any standard outlet socket 23.

The heating chamber 16 and the heating element 20 are provided with central horizontal slots 24, 25, respectively, whereby the heating chamber 16 may be advanced to enclose the disk D without interference from the horizontal shaft 10.

In order to slide the heating chamber 16 in the horizontal guides 17, 18, the rear wall 26 of the chamber 16 is provided with a pair of ears 27 to which a pitman rod 28 is pivotally secured by means of a pin 29. The pitman rod 28 is operated by means of a crank 30, which is secured upon a vertical shaft 31 so as to be rotated by a horizontal drive shaft 33 through the medium of suitable gearing, not shown, housed in a gear case 32.

In order to operate the drive shaft 33, provision is made of a shaft 34 which is rotatably carried in aligned and spaced relation thereto by means of bearings 35, 36. The shaft 34 is connected to a main driving motor 37 by means of a pair of pulleys 38, 39 and a belt 40.

A driving clutch disk 41 is fixed upon the inner end of the shaft 34, while a driven clutch disk 42 is carried by an integral grooved sleeve 43 which is slidably splined on the adjacent end of the drive shaft 33.

The driven clutch disk 42 is adapted to be moved into and out of engagement with the driving clutch disk 41 by means of a bell crank lever 44 which comprises a forward arm 45 having a depending clutch fork 46 which engages with the grooved sleeve 43.

The bell crank lever 44 is pivoted at its rear end on a bracket 47 so as to be swingable on a vertical axis and includes a lateral horizontal arm 48 to which an operating rod 49 is attached. The operating rod 49 extends forwardly to the front of the machine, where it is provided with a handle 50 convenient to the operator, and is slidably supported upon one of the heating chamber guides 17 by means of clips 51, 52.

The driven clutch disk 42 is normally held in disengaged position by means of a coiled spring 53 attached to the end of the lateral arm 48 of the bell crank lever 44. The coil spring 53 also tends to hold a nose 54 on the forward bell crank arm 45 within a notch 55 in a circular cam 56 secured upon the vertical shaft 31.

Thus, it will be seen that the operator may pull the operating rod 49 forwardly whenever desired in order to engage the driven clutch disk 42 with the driving clutch disk 41 and simultaneously disengage the nose 54 from the cam notch 55, whereupon the heating chamber 16 will be slid by means of the pitman 28 into a position embracing the phonograph disk D. One complete revolution of the crank 30 will return the heating chamber 16 to its rearward position, whereupon the nose 54 will drop into the cam notch 55 under the influence of the spring 53, so as to disengage the clutch 42 and stop the crank 30.

In order to start the main driving motor 37 at approximately the same time that the clutch disks 41, 42 are brought into engagement, provision is made of a movable switch contact arm 57 which is adapted to be forced laterally by the forward bell crank arm 45 in order to engage a fixed contact 58.

The contact arm 57 and the fixed contact 58 are connected in series with the main driving motor 37 by means of two pairs of wires 59, 59 and 60, 60 whereby said motor 37 will be energized from a pair of electric current supply wires 61.

The main driving motor 37 also drives the horizontal shaft 10 by means of a pair of pulleys 62, 63 which are connected by a belt 64, so that the disk D will be rapidly rotated on a horizontal axis and thereby maintained flat by centrifugal force in spite of its soft limp condition during the heating process.

It is, of course, desirable to keep the disk D flat not only during the heating process, but also during a sufficient interval of time thereafter to enable said disk to cool and regain its normal stiffness. Provision is therefore made of a timing motor 65 for continuing the operation of the main driving motor 37 after the bell crank lever 44 has moved to open the contacts 57, 58 and to disengage the clutch disk 42 from the clutch disk 41.

The timing motor 65 serves to rotate a circular cam 67 and is connected in parallel with the main driving motor 37 by means of a pair of wires 66, 66, which are joined to the wires 60, 60. The circular cam 67 has a notch 68 in its periphery and is adapted to press a resilient switch arm 69 against a fixed contact 70, excepting at such times as said switch arm may drop into said notch 68. The switch arm 69 and the fixed contact 70 are connected in parallel with the contact arm 57 and the contact 58 by means of the wires 59 and a pair of wires 71, whereby the operation of the main driving motor 37 will be prolonged after disengagement of the contact arm 57 from the contact 58, until such time as the circular cam 67 has made one complete revolution. The switch arm 69 will then drop into the notch 68 so as to break the circuit between the arm 69 and the contact 70.

Thus, it will be seen that the horizontal shaft 10 and the disk D thereon will continue to rotate for a time after the heating chamber 16 has been withdrawn to its rearward position, permitting the disk D to cool and harden in a perfectly flat condition.

It has been found that a speed of 800 revolutions per minute in the horizontal shaft 10 is suitable to maintain a record disk D, which is seven inches in diameter and 0.010″ thick, in a perfectly flat condition. The speed of the disk must, of course, be sufficient to maintain it in flat condition, but not so great as to cause the softened disk to deform radially. The shaft 10 will be rotated throughout the machine cycle, which may be accomplished in approximately 23 seconds.

*Operation*

In operation , the operator will place a disk D to be reprocessed over the reduced end 13 of the horizontal shaft 10 and then apply the nut 15 in order to clamp the disk against the shoulder 14. The operator will then pull the handle 50 which will cause the main driving motor 37 to start, so as to rotate the disk D rapidly and advance the heating chamber 16 to the dotted line position, embracing the disk D.

It will be understood that the electrical heating elements 19, 20 will first have been energized and will remain energized as long as the operator wishes to use the machine. Thus, the disk D will receive radiant heat from the heating elements 19, 20 for a short predetermined period of time, after which the heating chamber will be withdrawn to its rearward position, as shown in full lines in the drawing.

It will be understood that the heat received by the disk D will cause the material of said disk to soften slightly, thereby obliterating all grooves, creases, or other irregularities which may have been present, and causing both surfaces of the disk D to resume substantially their original flat smooth condition. The applied heat will not melt the material of the disk D, but will merely render it limp and somewhat plastic. Where the plastic material of the disk is a vinyl resin, a temperature of 145 degrees will usually be sufficient for this purpose.

The rotation of the disk D will continue throughout the heating and cooling steps so that the disk D will be held flat by centrifugal force while the material is soft. The disk D will thereafter continue to rotate until it has cooled, and will regain its normal stiffness. The rotation of the disk D will then stop, permitting the operator to remove it and replace it with another disk to be reprocessed.

One advantage of the invention herein disclosed, is that it will enable used thermoplastic phonographic record disks to be quickly and easily restored to their original condition suitable for receiving further recording.

Another advantage is that the reprocessing of the disks by the process herein disclosed does not involve the removal of any material from said disks, and the disks therefore can be used and reprocessed over and over again indefinitely, without the loss of any of their desirable recording qualities.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a machine for restoring used thermoplastic record disks in which grooves have been indented and which are provided with minor ungrooved portions in the centers thereof, a rotatable means for supporting a disk by its ungrooved portion and in a plane at right angles to the axis of rotation, said means being constructed and arranged to leave the major portion of both surfaces of said disk free from contact with any solid surface, means for heating said disk, and means operable simultaneously with said heating means for rotating said rotatable supporting means and the disk thereon, whereby the disk may be maintained flat by the action of centrifugal force and the grooves thereon may be obliterated by the heating action.

2. The invention as defined in claim 1, which includes mechanism for advancing said heating means into proximity with said disk to heat the disk, and withdrawing said heating means to allow said disk to cool.

3. The invention as defined in claim 2, including means for maintaining the rotation of said disk after said heating means has been withdrawn therefrom, whereby the disk may be maintained flat while it cools.

4. The invention as defined in claim 1, in which said axis of rotation is horizontal.

5. In a machine for restoring used thermoplastic phonographic record disks in which grooves have been indented, a shaft having means for securing a disk thereon, a heating chamber, means movably supporting said heating chamber, mechanism for successively causing said heating chamber to embrace said disk, and relatively separating said heating chamber and said disk, drive means operatively connected to said mechanism for rapidly rotating said shaft, and means for maintaining the rotation of said shaft for a predetermined limited time after said heating chamber has been separated from said disk.

6. In a process of restoring used thermoplastic phonograph record disks in which grooves have been indented, the steps of heating a record disk for a limited time to a temperature which is sufficient to relieve strains in the disk material and insufficient to melt said material, and rotating said disk about its axis at a speed sufficient to maintain it flat during the heating step, whereby the grooves may be eliminated by strain relief resulting from the heat and the disk will be maintained flat by centrifugal action.

7. The invention as defined in claim 6, in which said rotating step is continued for a predetermined period of time after termination of the heating step until the disk has cooled and regained its original stiffness.

8. In a process of restoring a used thermoplastic record member having grooves formed in a portion thereof by embossing and indenting, the steps of heating said record member to a temperature which is sufficient to relieve strains in the grooved portion thereof, and insufficient to melt the record material, terminating the heating step, and maintaining the grooved portion of said record member flat and free from contact with any other object by spinning about its axis during said heating step and until said record member has cooled.

9. In a machine for restoring used thermoplastic grooved record discs which are provided with minor ungrooved portions in the centers thereof, a rotatable means for supporting a disk by its ungrooved portion and in a plane at right angles to the axis of rotation, said means being constructed and arranged to leave the major portion of both surfaces of said disk free from contact with any solid surface, means for heating said disk, and means operable simultaneously with said heating means for rotating said rotatable supporting means and the disk thereon, whereby the disk may be maintained flat by the action of centrifugal force and the grooves thereon may be obliterated by the heating action.

10. In a process of restoring used thermoplastic phonograph record disks in which grooves have been embossed, the steps of bringing a heater and said record disk into proximity with with one another to heat the record disk to a temperature which is sufficient to relieve embossing strains in the record material and insufficient to melt said material, rotating said record disk about its axis at a speed sufficient to maintain the disk flat by centrifugal force while it is in a heated condition, producing a relative separating movement between said heater and record disk to terminate the heating step, and thereafter terminating the rotating step when the record disk has cooled.

11. A machine for reconditioning a used phonograph record disk of thermoplastic material, to obliterate embossed recordations therefrom, comprising rotatably-mounted means for holding said record disk by its central unused portion and for supporting the disk in a plane at right angle to the axis of rotation, means for heating the outer used portion of said disk, means for rotating said holding means and the disk thereon at a speed sufficient to maintain the disk flat while it is in a heated condition, and means adapted for rendering said heater ineffective and for stopping said rotating means in the order here named.

12. A machine for reconditioning a used phonograph record disk of thermoplastic material, to obliterate embossed recordations therefrom, comprising rotatable means for supporting a record disk for rotation about its geometric axis in a plane at right angles to said axis without contacting the used portion of the record with any solid object, means for heating the used portion of said record disk, means for rotating said supporting means and a record disk thereon to maintain the latter flat by centrifugal force while the disk is in a heated condition, timing means for rendering said heating means ineffective after a preset interval, means for starting said rotating means and concurrently placing said timing means in operation, and means for stopping said rotating means.

13. A machine for reconditioning a used phonograph record disk of thermoplastic material to obliterate embossed recordations therefrom, comprising rotatably-mounted means for holding said record disk by its central unused portion and for supporting the disk in a plane at right angles to the axis of rotation, means for heating the outer used portion of said disk, means for rotating said holding means and the disk thereon at a speed sufficient to maintain the disk flat while it is in a heated condition, means mounting said heating means and record disk for relative movement to place the heating means in an effective position in proximity with the record disk and in an ineffective position away from the disk, and a single means operable to start said rotating means and to cause said heating means to be moved into said effective position.

14. In a machine for restoring used thermoplastic phonograph record disks in which grooves have been embossed; the combination of a rotatably-mounted holding means for engaging the central hub portion of a record disk and supporting the disk for rotation about its geometric axis, a heating chamber for heating said record disk to erase said grooves therefrom, means mounting said heating chamber for movement into an effective position wherein it embraces said disk and into ineffective positions wherein it is separated from the disk, and drive means for rotating said holding means and the disk thereon to maintain the disk flat by centrifugal force while the disk is in a heated condition.

DONALD F. BALMER.

REFERENCES CITED

The following references are of record in the file of this patent:

UNITED STATES PATENTS

| Number | Name | Date |
|---|---|---|
| 669,119 | Krank | Mar. 5, 1901 |
| 824,710 | Desgrandchamps | July 3, 1906 |
| 2,265,032 | Feyrer | Dec. 2, 1941 |
| 2,340,161 | Van Deventer | Jan. 25, 1944 |